(12) United States Patent
McClay et al.

(10) Patent No.: US 8,304,093 B2
(45) Date of Patent: Nov. 6, 2012

(54) APPARATUS AND METHOD FOR PREFERENTIAL FORMATION OF WELD JOINT

(75) Inventors: Paul C. McClay, South Berwick, ME (US); Susan M. Tholen, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 289 days.

(21) Appl. No.: 12/720,370

(22) Filed: Mar. 9, 2010

(65) Prior Publication Data

US 2011/0220622 A1    Sep. 15, 2011

(51) Int. Cl.
*B23K 15/00* (2006.01)

(52) U.S. Cl. ............. 428/680; 219/121.14; 415/232; 29/889

(58) Field of Classification Search ............. 219/121.13, 219/121.14, 121.63, 121.64; 428/637, 678, 428/680; 415/232; 29/889
See application file for complete search history.

(56) References Cited

U.S. PATENT DOCUMENTS

| | | | | |
|---|---|---|---|---|
| 4,850,802 A | * | 7/1989 | Pankratz et al. | 416/213 R |
| 4,903,888 A | * | 2/1990 | Clark et al. | 228/119 |
| 4,911,037 A | | 3/1990 | Werz | |
| 5,351,395 A | * | 10/1994 | Crawmer et al. | 29/889.7 |
| 5,383,985 A | * | 1/1995 | Coulon | 148/527 |
| 5,635,092 A | * | 6/1997 | O'Neil | 219/441 |
| 6,083,257 A | * | 7/2000 | Taylor et al. | 623/1.46 |
| 6,568,077 B1 | * | 5/2003 | Hellemann et al. | 29/889.1 |
| 6,838,190 B2 | * | 1/2005 | Lee et al. | 428/670 |
| 7,424,900 B2 | | 9/2008 | Soga et al. | |
| 7,767,318 B2 | * | 8/2010 | Cheng et al. | 428/696 |
| 2006/0239823 A1 | * | 10/2006 | Mielke et al. | 416/224 |
| 2007/0045260 A1 | | 3/2007 | Feng et al. | |
| 2009/0230108 A1 | | 9/2009 | Nakahara et al. | |

OTHER PUBLICATIONS

Extended European Search Report issued on Jul. 19, 2011 in connection with corresponding European Application No. 11157514.8-2302 (attached herewith).

* cited by examiner

*Primary Examiner* — Samuel M Heinrich
(74) *Attorney, Agent, or Firm* — Miller, Matthias & Hull LLP

(57) ABSTRACT

A weld set-up and weld process are provided that alleviate micro-cracking as between a pair of welded pieces. The weld set-up is provided in which the weld pieces are configured to cause micro-cracking to occur in a portion of the welded pieces that is then removed by post-processing machining techniques. This weld set-up includes a primary weld piece and a secondary weld piece with a flange portion that extends over the primary weld piece. When used in conjunction with electron beam welding, application of the weld beam onto the secondary weld piece causes the formation of a preferential nailhead that is formed exclusively in the first weld piece.

20 Claims, 4 Drawing Sheets

APPARATUS AND METHOD FOR PREFERENTIAL FORMATION OF WELD JOINT

TECHNICAL FIELD

The present invention relates generally to welding, and more particularly, to embodiments of a weld set-up and welding process that may form a weld joint with preferential geometry that alleviates micro-cracking among the pieces adjoined by the weld joint.

BACKGROUND

Many welding processes result in weld joints with features inherently associated with the heat affected zone ("HAZ"). Some of these features are accepted as negligible by-products of the resulting weld joint. These by-products neither enhance nor reduce any particular characteristic of the weld joint.

On the other hand, weld joints and their associated features can also have undesirable defects, which may be detrimental to the strength, reliability, or overall longevity of the weld joint and the resulting welded structure. These defects may cause problems within the welded structure, and more particularly, such defects may include micro-cracks and other deviations in the welded structure adjoined by the weld joint. Micro-cracks may further propagate to a point that results in failure of the weld joint and/or other more catastrophic failure events.

SUMMARY

There is described below embodiments in accordance with the present invention that facilitate preferential geometry of a weld joint that may result in the preferential location of defects (e.g., micro-cracks) that are associated with the weld joint. This preferential geometry may, in one embodiment, locate in selective regions of the welded pieces features such as nailheads particular to the weld joint and/or the welding technique. These selective regions may be removed from the resulting welded structure in a manner that may substantially remove defects associated generally with the weld joint, and in particular examples, the regions that are removed may include micro-cracks associated with the nailheads.

By way of non-limiting example, there is provided in one embodiment a method for reducing micro-cracks induced by an electron welding beam. The method can comprise steps for providing a first part having a surface facing the welding beam, and abutting a second part to the first part to form a weld joint, the second part including a flange extending over the surface. The method can be further described where the first part and the second part form a work-piece that includes a sacrificial portion and a working portion separated from the sacrificial portion by a post-processing zone. The method can be yet further described where the second part receives the electron welding beam with welding parameters that cause a first nailhead to form exclusively in the first part.

There is also provided in another embodiment an apparatus prepared for weld by an electron welding beam. The apparatus can comprise a first part having a surface facing the electron welding beam, and a second part abutting the first part to form a weld joint, the second part including a flange extending away from the weld joint over the surface of the first part. The apparatus can be further described where the first part and the second part form a work-piece that includes a sacrificial portion and a working portion separated from the sacrificial portion by a post-processing zone. The apparatus can be further described where the sacrificial portion includes the flange.

BRIEF DESCRIPTION OF THE DRAWINGS

So that the manner in which the above recited features of the present invention may be understood in detail, a more particular description of the invention is provided by reference to the embodiment, which is illustrated in the accompanying drawings. It is to be noted, however, that the appended drawings illustrate only typical embodiments of this invention and are therefore not to be considered limiting of its scope, for the invention may admit to other equally effective embodiments. Moreover, the drawings are not necessarily to scale, emphasis generally being placed upon illustrating the principles of certain embodiments of invention.

Thus, for further understanding of the concepts of the invention, reference may be made to the following detailed description, read in connection with the drawings in which.

DETAILED DESCRIPTION

In accordance with its major aspects and broadly stated, embodiments of the present invention are directed to welding methods and apparatus implemented in a manner that controls certain characteristics of a weld. There is provided in one embodiment, for example, such welding methodology in which the geometry of the weld is manipulated so that particular features (e.g., nailheads) of the weld are situated in preferential locations as between two welded pieces. This preferential location permits implementation of post-weld processes to remove these preferentially located features without disturbing the functionality of the remaining welded work-piece. This manipulation of the weld and/or weld joint is particularly beneficial to electron beam welding techniques and related implementations because the preferential location of the nailhead permits removal of imperfections and defects such as areas of micro-cracking associated with, and in the vicinity of, the nailhead.

Figure 1:
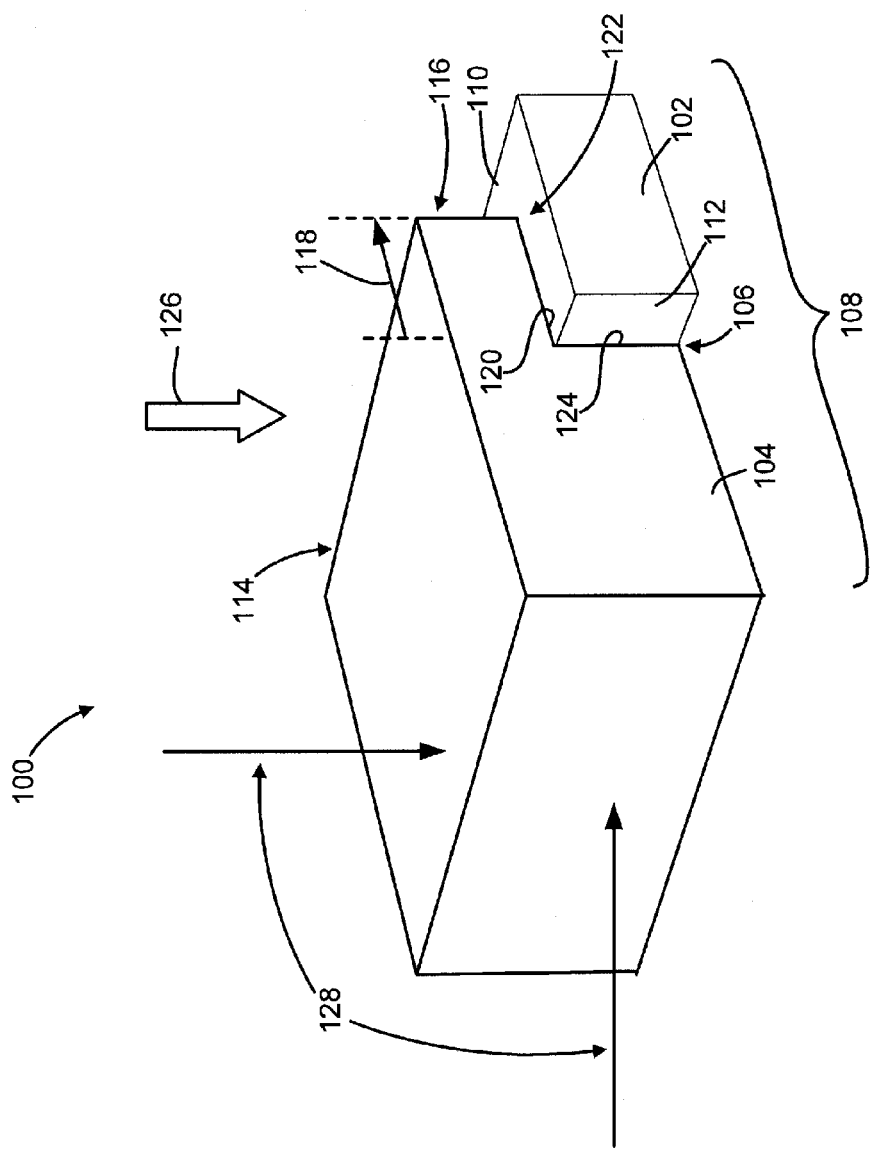
FIG. 1 is a functional schematic diagram of a perspective view of an exemplary embodiment of a weld set-up.

For further explanation of this and other concepts reference may be had to the functional diagram of FIG. 1 in which there is illustrated an exemplary embodiment of a welding set-up 100. As depicted in FIG. 1, the welding set-up 100 may comprise a primary piece 102 and a secondary piece 104 secured to the primary piece 102 by a weld joint 106 to form a welded work-piece 108. The primary piece 102 may comprise an upper surface 110 and a primary abutment surface 112 that in the present example is illustrated as being substantially perpendicular to the upper surface 110. The secondary piece 104 may comprise a flange portion 114 with an end surface 116, the flange portion 114 being configured to extend over the upper surface 110 a relative distance 118 as measured between the weld joint 106 and the end surface 116. The flange portion 114 may also comprise a bottom flange surface 120 that may form an interface 122 with the upper surface 110 of the primary piece 102. The interface 122 may be a gap or void between the upper surface 110 and the bottom flange surface 120. The secondary piece 104 may also comprise a secondary abutment surface 124 configured to abut with the primary abutment surface 112 in a manner that permits formation of the weld joint 106 upon application of a welding beam 126.

The welding set-up 100 and related welding methods discussed below may be applied to a variety of materials and part production techniques. Combinations of cast and wrought metals, for example, are compatible with the concepts disclosed herein so as to permit construction of the welded work-piece 108 with formation of one or more nailheads in locations that permit substantial removal of micro-cracking associated with the nailhead. More particular configurations are contemplated in which one or more of the primary piece 102 and the secondary piece 104 (collectively "the welded pieces") are cast, forged, drawn, rolled, or produced using similarly suitable production techniques.

Each of the welded pieces 102, 104 may likewise comprise materials with varying composition such as may be found in metal alloys and similar composite materials. At a relatively high level, these alloys and composites may comprise one or more of nickel, aluminum, titanium, chromium, cobalt, and molybdenum, among many others. More particular implementations of the concepts disclosed herein may be used in connection with certain "superalloys," which may comprise one or more of these materials (and their composites and derivations) in varying weight percentages. Examples of such superalloys may comprise for example at least about 50% nickel, as well as materials in various percentages such as about 19% chromium, about 13% cobalt, about 4% molybdenum, about 3% titanium, and at least about 1% aluminum. In one particular implementation of the inventive concepts, the welded pieces may comprise WASPALOY® manufactured by United Technologies Corporation of Harford, Conn.

As illustrated in FIG. 1, the secondary piece 104 may be formed monolithically to incorporate the flange portion 114 and other structural features unilaterally with the remainder of the secondary piece 104. This construction may be accomplished using various machining techniques that may, for example, form from a single piece of material the flange portion 114 and the secondary abutment surface 124. These techniques may also be used to prepare the secondary abutment surface 124 and/or the primary abutment surface 112 so that each is configured to maximize effectiveness of the weld joint 106. Moreover, material thickness of the flange portion 114 may vary based on, for example, properties of the weld beam 126, which may influence the size and location of, e.g., the nailheads. In the one example, the flange portion 114 may have a relative thickness from about 2 mm to about 6 mm. The overall thickness of the welded pieces may also vary, with one or more of the welded pieces having a material thickness from about 7 mm to about 25 mm. In one example, the material thickness may be at least about 12 mm for at least one of the primary piece 102 and the secondary piece 104.

In one embodiment, the weld set-up 100 may also comprise means for clamping, which is illustrated generally in FIG. 1 as a plurality of loading vectors 128. The means may be used to secure together the primary piece 102 and the secondary piece 104 prior to and during the application of weld beam 126 to form the weld joint 106. The loading vectors 128 designate by example certain possible directions upon which the means for clamping can be implemented to secure the welding set-up 100. In one example, the load vectors 128 may be orthogonal to the welded pieces 102, 104. Clamps, vices, vice grips, as well as customized rigging, forms, and fixtures are contemplated as suitable for applying and maintaining one or more of the loads 128. The configuration, orientation, and association of the welded pieces (e.g., the primary piece 102 and the secondary piece 104) can likewise be manipulated such as by thermal expansion and/or contraction of the welded pieces to apply and maintain forces exemplified by one or more of the load vectors 128. In one example, the loads 128 may be so applied to minimize the interface 122, and in one particular construction, contact may occur between the upper surface 110 and the bottom flange surface 120.

Figure 2:
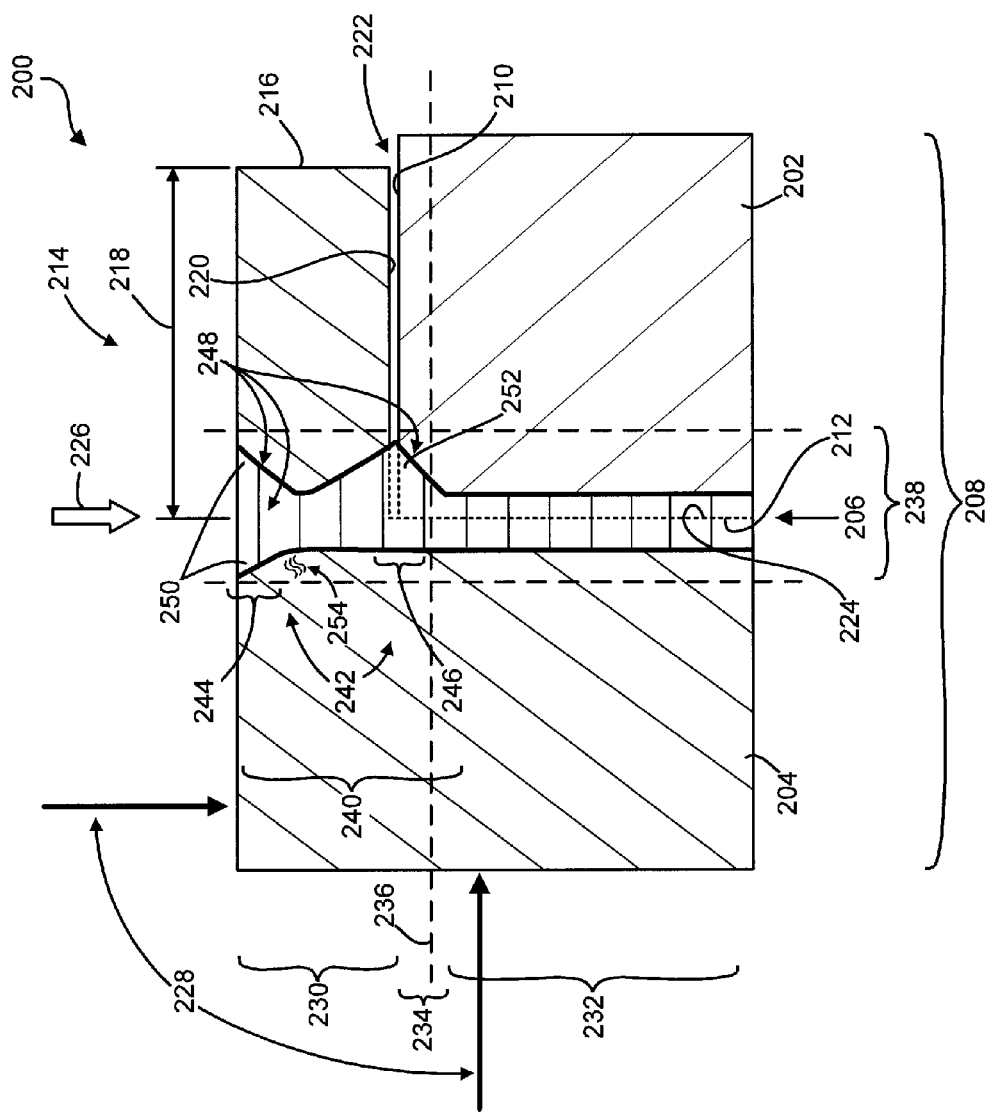
FIG. 2 is a sectioned, side, elevation view of another exemplary embodiment of a weld set-up, such as the weld set-up of FIG. 1.

Turning next to the illustration of FIG. 2, there is provided a cross-section of another exemplary embodiment of a weld set-up 200 that is made in accordance with the present invention. Like numerals are used to identify like components as between FIGS. 1 and 2, except that the numerals have been increased by 100 (e.g., 100 is now 200 in FIG. 2). For example, the weld set-up 200 of FIG. 2 may comprise a primary part 202, a secondary part 204, and a weld joint 206. The weld set-up 200 may also comprise a sacrificial portion 230, a working portion 232, and a post-processing portion 234 with a post-processing machining line 236 that separates the sacrificial portion 230 from the working portion 232.

There is also shown that the weld set-up 200 may comprise a weld zone 238 that may incorporate portions of both the primary piece 202 and the secondary piece 204 such as defined by the HAZ resulting from application of the welding beam 226. The weld zone 238 may also comprise weld features 240 such as nailheads 242 that are formations typically associated with application of the weld beam 226 (e.g., an electron beam), and in one particular construction the nailheads 242 may comprise a primary nailhead 244 and a preferential nailhead 246, both of which may form in response to the selected welding technique for use as the welding beam 226. By way of non-limiting example, the welding technique may be conventional electron beam welding.

The primary nailhead 244 and the preferential nailhead 246 may comprise one or more nailhead portions 248. The formation of the nailhead portions 248 is generally understood by those artisans knowledgeable in the welding arts, and thus additional details are not necessary. As discussed above, configurations of the welding pieces, some of which are illustrated in FIGS. 1 and 2, may promote preferential location of the nailheads 242. This preferential location may define, in one example, the location of the primary nailhead 244, the preferential nailhead 246, as well as the distribution, location, and/or size of the nailhead portions 248.

Particular to the exemplary embodiment of FIG. 2, it is seen that the configuration of the welding pieces 202, 204 may facilitate formation in the secondary piece 204 of the primary nailhead 244 with a pair of primary nailhead portions 250. Likewise this configuration promotes formation in the primary piece 202 of the preferential nailhead 246 with a preferential nailhead portion 252. The location of the preferential nailhead portion 252 exclusively in the primary piece 202, in combination with the lack of any complimentary nailhead portion of the preferential nailhead 246 co-located in the secondary piece 204, is beneficial because the resulting preferential geometry effectively re-locates areas of micro-cracking to desired portions of the weld set-up 200.

To exemplify, in one embodiment of the weld set-up 200 the preferential geometry may locate an area of micro-cracking 254 outside of the working portion 232 such as in the sacrificial portion 230. Post-process techniques such as machining along the post-processing machining line 236 may be employed to separate the sacrificial portion 230 from the working portion 232. This separation removes the area of micro-cracking 254 that may effectively leave the working portion 232, and more particularly the secondary piece 204, free from, e.g., micro-cracks, which would normally originate at or around the preferential nailhead 246.

Weld set-ups of the type contemplated by the weld set-up 100 and 200 discussed above may be implemented as part of, or in conjunction with, one or more welding processes such as the welding process illustrated in FIGS. 3 and 4 and described below. For purposes of the following discussion, but by way of non-limiting examples, these welding processes may be implemented using an electron beam welding apparatus. Though not disclosed in detail herein, relevant knowledge about the design, operation, and process parameters of such electron beam welders may be readily understood by those artisans skilled in the welding arts.

Figure 3:
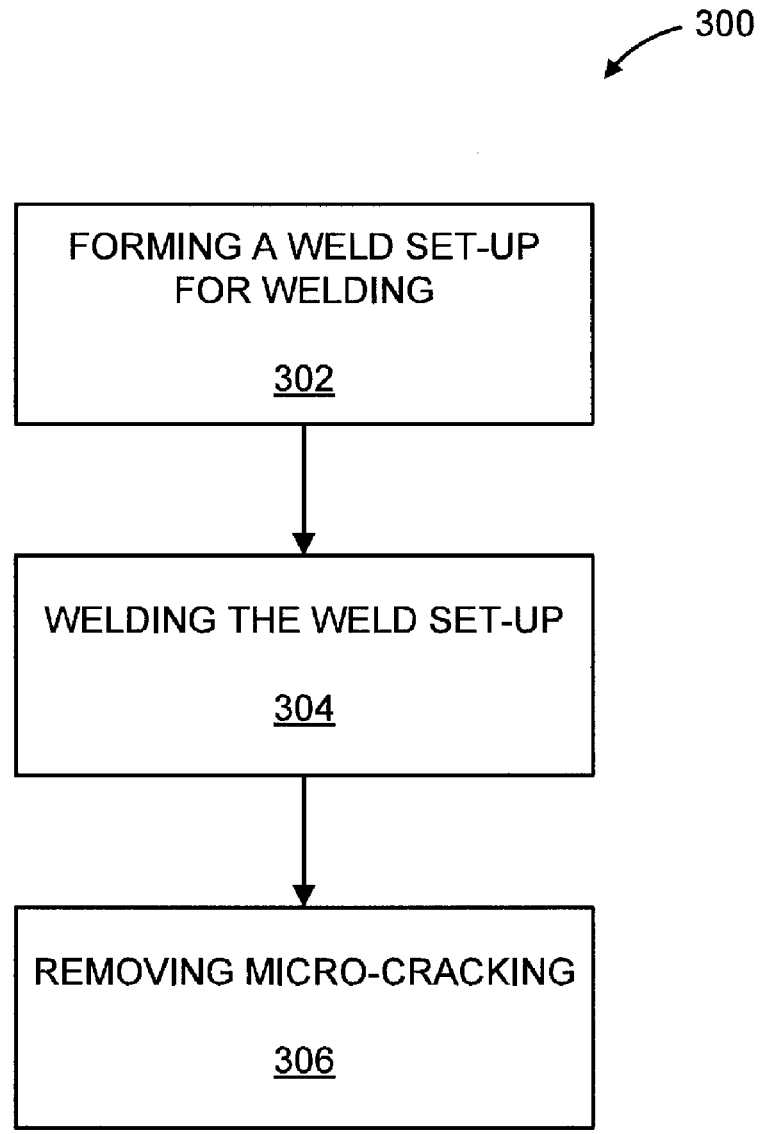
FIG. 3 is a flow diagram of a welding process that results in preferential formation of a weld joint.

Turning now to FIG. 3, and also FIG. 2, there is provided an exemplary embodiment of a welding method 300 embodying concepts of the present disclosure. The welding method 300 may comprise, at step 302, forming a weld set-up for welding. This weld set-up may be constructed as discussed in connection with the weld set-up 200 discussed above. The welding method 300 may also comprise, at step 304, welding the weld set-up 200, which may be accomplished by imparting the electron beam onto the secondary piece 204. Process parameters for the electron beam may be determined based on properties of the primary piece 202 and/or the secondary piece 204, including but not limited to material composition, thickness, depth of weld (e.g., depth of weld joint 206), among many others. The welding method 300 may further comprise, at step 306, removing micro-cracking near the weld joint 206, which in one example may be achieved by removing at least the primary nailhead 244 from the secondary piece 204 of the weld set-up 200.

Figure 4:
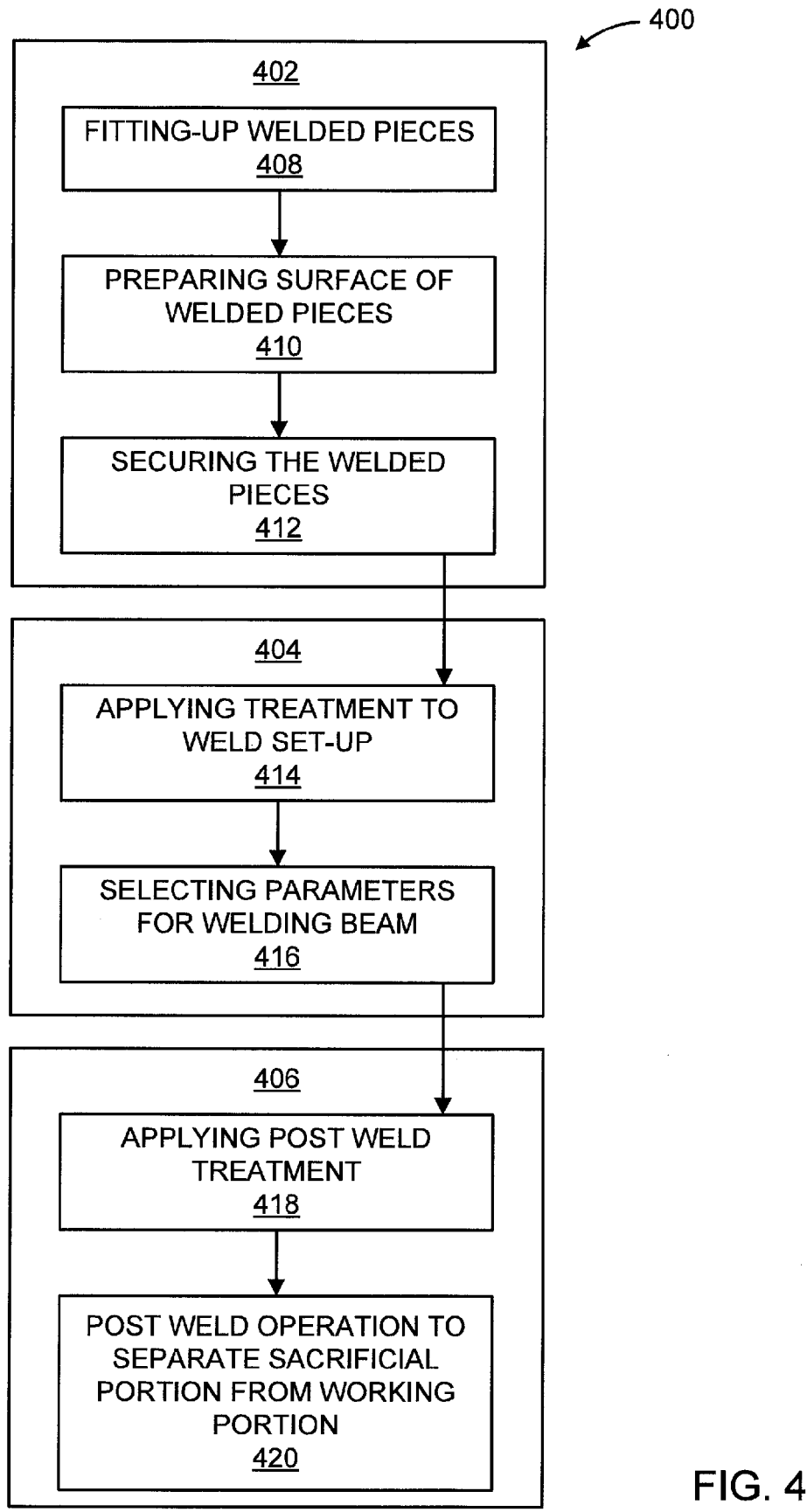
FIG. 4 is a flow diagram of another welding process that results in preferential formation of a weld joint.

There is also provided in FIG. 4 an exemplary embodiment of a welding method 400. In this example, like numerals are also used to identify complimentary steps as between the methods illustrated in FIGS. 3 and 4, except the numerals are increased by 100 (e.g., 300 is now 400 in FIG. 4). By way of non-limiting example, the welding method 400 may comprise, at step 402, forming a weld set-up 200 for welding, at step 404, welding the weld set-up 200, and at step 406, performing a post-weld operation. More particular to the embodiment of welding method 400 of FIG. 4, there is also provided such welding method 400 that comprises, at step 408, fitting-up the secondary piece 204 with the primary piece 202, at step 410, preparing the surface 212, 224 of each of the secondary piece 204 and the primary piece 202, and at step 412, securing the secondary piece 204 to the primary piece 202.

Each of the steps 410-412 may be implemented in any one of a variety of ways. Fitting-up of the two pieces of the weld set-up 200 may be accomplished by way of machining techniques that are used to form one or both of the welded pieces 202, 204. When the secondary piece 204 is, for example, a replacement or add on part to the primary piece 202, then machining may be used to remove any formerly attached piece from the primary piece 202 so as to make room for the secondary piece 204 that is to be attached thereon. These same machining techniques may be used as or in conjunction with surface preparation techniques such as deburring to prepare portions the welded pieces 202, 204, such as the abutting surfaces 212, 224 of the welded pieces 202, 204. These techniques may provide uniform, clean, and unadulterated mating surfaces about which to form the weld joint 206. Once properly fit and prepared for welding, the welded pieces 202, 204 may be secured together such as by fixture so that the welding process may be applied to the resulting weld set-up 200.

In view of the foregoing, embodiments of the welding method 400 may also comprise, at step 414, applying treatment to the weld set-up 200, and also, at step 416, selecting parameters for the welding beam 226. One or more of the steps 414 and 416 may utilize treatments to modify, either permanently or temporarily, the material morphology of one or more of the welded pieces 202, 204 such as, for example, treatments that raise and/or lower the temperature of one or more of the welded pieces 202, 204. In one example, each of the welded pieces 202, 204 may be heated to provide a softened material morphology or structure. The material in one construction may be softened to a point consistent with the various weld parameters of the welding process, e.g., the electron welding process. The weld parameters may likewise be determined and/or selected as required to achieve the desired joining properties of the welded pieces 202, 204. Certain parameters of electron beam welders, while not discussed in detail herein, may be selected based on, for example, the incorporation of WASPALOY in the welded pieces 202, 204 of the weld set-up 206.

Embodiments of the welding method 400 may further comprise additional steps such as at steps 418, applying post-welding treatment to the weld set-up 200, and at step 420, performing post weld-operations to separate the sacrificial portion 230 and the working portion 232. Suitable post-weld operations may comprise machining the work-piece 208 along the post-processing machining line 236. These operations may further comprise other operations related to the welding process and/or other polishing, sanding, and deburring techniques that may be used to separate and or make useful the material of the working portion 232.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values may include the actual value that is expressly stated, as well as other values that are, or may be, the decimal, fractional, or other multiple of the actual value indicated, and/or described in the disclosure.

While the present invention has been particularly shown and described with reference to an exemplary embodiment, it will be understood by one skilled in the art that various changes in detail may be effected therein without departing from the spirit and scope of the invention as defined by claims that may be supported by the written description and drawings. Further, where this exemplary embodiments (and other related derivations) are described with reference to a certain number of elements it will be understood that other exemplary embodiments may be practiced utilizing either less than or more than the certain number of elements.

What is claimed is:

1. A method for reducing micro-cracks induced by an electron welding beam, said method comprising:
providing a first piece having a surface facing the welding beam;
abutting a second piece to the first piece to form a weld joint, the second piece including a flange extending over the surface of the first piece facing the welding beam, wherein the first piece and the second piece form a workpiece that includes a sacrificial portion and a working portion separated from the sacrificial portion by a post-processing zone, and
wherein the second piece receives the electron welding beam with welding parameters that cause a first nailhead to form exclusively in the first piece.

2. A method according to claim 1, wherein the flange is formed monolithically with the second piece.

3. A method according to claim 1, further comprising clamping the first piece and the second piece.

4. A method according to claim 1, further comprising performing a pre-weld treatment of each of the first piece and the second piece, wherein the pre-weld treatment changes the material morphology of the first piece and the second piece.

5. A method according to claim 1, further comprising separating the sacrificial portion from the working portion along a post-processing machining line, wherein the post-processing machining line defines each of the sacrificial portion and the working portion, and wherein the sacrificial portion further includes a portion of the first nailhead.

6. A method according to claim 1, wherein the first piece and the second piece comprise a superalloy have at least about 50% nickel.

7. A method according to claim 6, wherein the superalloy includes about 19% chromium, about 13% cobalt, about 4% molybdenum, about 3% titanium, and about 1.4% aluminum.

8. A method according to claim 6, wherein the first piece is formed by casting, and wherein the second piece is formed by forging.

9. A method according to claim 1, wherein the welding parameters cause a second nailhead to form proximate the flange.

10. A method according to claim 1, further comprising heating the work-piece after formation of the first nailhead.

11. An apparatus prepared for weld by an electron welding beam, said apparatus comprising:
a first piece having a surface facing the electron welding beam; and
a second piece abutting the first piece to form a weld joint, the second piece including a flange extending away from the weld joint over the surface of the first piece facing the electron welding beam,
wherein the first piece and the second piece form a workpiece that includes a sacrificial portion and a working portion separated from the sacrificial portion by a post-processing portion, and
wherein the sacrificial portion includes the flange.

12. An apparatus according to claim 11, wherein the flange is formed monolithically with the second piece.

13. An apparatus according to claim 11, wherein the first piece and the second piece comprise at least 50% nickel.

14. An apparatus according to claim 11, wherein the first piece and the second piece comprise about 58% nickel, about 19% chromium, about 13% cobalt, about 4% molybdenum, about 3% titanium, and about 1.4% aluminum.

15. An apparatus according to claim 11, wherein the first piece includes a cast material and the second piece includes a forged material, and wherein each of the cast material and the forged material comprise a superalloy.

16. An apparatus according to claim 11, wherein the post-processing portion includes a post-weld machining line that defines each of the sacrificial portion and the working portion, and wherein the sacrificial portion further includes at least a portion of the first piece.

17. An apparatus according to claim 11, further comprising a means for clamping the first piece and the second piece.

18. An apparatus according to claim 17, wherein the means for clamping applies a clamping force that biases together the flange and the surface of the first piece.

19. An apparatus according to claim 11, wherein the flange includes an end surface located a relative distance from the weld joint, and wherein the relative distance is larger than a weld zone formed by the electron welding beam in the flange.

20. An apparatus according to claim 19, wherein the weld zone includes a plurality of nailheads that result from application of the electron welding beam to the second piece, and wherein the nailheads comprise a first nailhead formed exclusively in the first piece.

* * * * *